(12) United States Patent
Cook et al.

(10) Patent No.: US 12,111,004 B2
(45) Date of Patent: Oct. 8, 2024

(54) BULKHEAD FITTING DEVICE ENABLING SLIGHT RELATIVE MOVEMENTS AND THE ABSORPTION OF FORCES BETWEEN A CONDUIT AND A WALL, AND INSTALLATION INCLUDING AT LEAST ONE SUCH BULKHEAD FITTING DEVICE

(71) Applicant: Airbus Operations SAS, Toulouse (FR)

(72) Inventors: Jordan Cook, Toulouse (FR); Frédéric Rossi, Toulouse (FR); Julien Cayssials, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 39 days.

(21) Appl. No.: 17/873,368

(22) Filed: Jul. 26, 2022

(65) Prior Publication Data
US 2023/0030602 A1 Feb. 2, 2023

(30) Foreign Application Priority Data
Jul. 28, 2021 (FR) ...................................... 2108180

(51) Int. Cl.
*F16L 5/10* (2006.01)
*F16J 15/02* (2006.01)

(52) U.S. Cl.
CPC .............. *F16L 5/10* (2013.01); *F16J 15/022* (2013.01)

(58) Field of Classification Search
CPC ... F16L 5/025; F16L 5/10; F16J 15/021; F16J 15/022; F16J 15/024

USPC .......................................... 277/606, 616, 626
See application file for complete search history.

(56) References Cited

U.S. PATENT DOCUMENTS

| | | | | |
|---|---|---|---|---|
| 2,620,208 A | * | 12/1952 | Patch | F16L 5/025 277/504 |
| 3,688,746 A | * | 9/1972 | Newitts | F16J 15/52 122/494 |
| 4,331,338 A | | 5/1982 | Caldwell et al. | |
| 4,685,173 A | * | 8/1987 | Pavur | F16L 5/10 16/2.2 |
| 5,366,318 A | * | 11/1994 | Brancher | E03F 5/02 285/236 |
| 5,433,183 A | * | 7/1995 | Vansnick | F02M 26/12 285/305 |

(Continued)

OTHER PUBLICATIONS

French Search Report; priority document.

*Primary Examiner* — Nicholas L Foster
(74) *Attorney, Agent, or Firm* — Greer, Burns & Crain, Ltd.

(57) ABSTRACT

A bulkhead fitting device configured to sealingly link a conduit and a wall traversed by the conduit. This bulkhead fitting device includes a first ring sealingly linked to the conduit, a second ring having a flat, ring-shaped sealing face configured to be pressed against a contact face of the wall or of an intermediate part linked to the wall, an elastically deformable intermediate annular portion sealingly linking the first and second rings, a holding system configured to press the sealing face against the contact face. This bulkhead fitting device guarantees an optimum seal while enabling the absorption of forces and slight relative movements between the conduit and the wall. The device also helps to limit the propagation of vibration.

7 Claims, 2 Drawing Sheets

(56) References Cited

U.S. PATENT DOCUMENTS

| | | | | |
|---|---|---|---|---|
| 5,722,699 | A * | 3/1998 | Brancher | F16L 5/08 |
| | | | | 285/142.1 |
| 5,826,919 | A * | 10/1998 | Bravo | F16L 5/025 |
| | | | | 285/236 |
| 7,828,298 | B2 * | 11/2010 | Cummings | F16L 5/04 |
| | | | | 277/502 |
| 10,746,338 | B2 * | 8/2020 | Waitkus | F16L 41/18 |
| 11,320,067 | B2 * | 5/2022 | Short | F16L 3/127 |
| 2008/0265526 | A1 * | 10/2008 | Cummings | F16L 5/04 |
| | | | | 277/606 |
| 2008/0265527 | A1 | 10/2008 | Free | |
| 2020/0072402 | A1 * | 3/2020 | Waitkus | F01D 25/243 |
| 2021/0033222 | A1 * | 2/2021 | Short | F16L 5/025 |
| 2022/0243842 | A1 * | 8/2022 | Short | F16L 5/14 |

* cited by examiner

BULKHEAD FITTING DEVICE ENABLING SLIGHT RELATIVE MOVEMENTS AND THE ABSORPTION OF FORCES BETWEEN A CONDUIT AND A WALL, AND INSTALLATION INCLUDING AT LEAST ONE SUCH BULKHEAD FITTING DEVICE

CROSS-REFERENCES TO RELATED APPLICATIONS

This application claims the benefit of the French patent application No. 2108180 filed on Jul. 28, 2021, the entire disclosures of which are incorporated herein by way of reference.

FIELD OF THE INVENTION

The present application relates to a bulkhead fitting device enabling slight relative movements and the absorption of forces between a conduit and a wall, as well as an installation including at least one such bulkhead fitting device.

BACKGROUND OF THE INVENTION

According to one configuration, an installation includes a wall with an orifice passing therethrough, a conduit passing through the wall via the orifice, and a bulkhead fitting device positioned partially inside the orifice and interposed between the conduit and the wall.

According to a first embodiment, a grommet bulkhead fitting device comprises a cylindrical elastomer body with an external slot designed to seat the wall about the orifice, and a through-hole with a diameter slightly less than the external diameter of the conduit. This first embodiment enables slight relative movements between the conduit and the wall. However, this does not provide an optimum seal and does not enable the absorption of forces.

No embodiment from the prior art guarantees an optimum seal while enabling the absorption of forces and slight relative movements between the conduit and the wall.

The present invention is intended to overcome some or all of the drawbacks in the prior art.

SUMMARY OF THE INVENTION

For this purpose, the invention relates to a bulkhead fitting device designed to link a wall with an orifice and a conduit passing through the wall via the orifice, characterized in that the bulkhead fitting device includes:
- a first ring designed to be positioned about the conduit and sealingly linked to said conduit,
- a second ring having a flat, ring-shaped sealing face designed to be oriented towards the wall and to be pressed against a contact face of the wall or of an intermediate part linked to the wall,
- an elastically deformable intermediate annular portion sealingly linking the first and second rings,
- a holding system designed to press the sealing face against the contact face to create a seal between the sealing and contact faces,
- the first and second rings and the intermediate annular portion form a single part.

According to the invention, the second ring and the sealing face thereof provide an optimum seal between the bulkhead fitting device and the wall or an intermediate part linked to the wall, while enabling a load transfer to the wall. In parallel, the intermediate annular portion absorbs vibrations, enables at least one relative movement between the conduit and the wall, and absorbs some forces between the conduit and the wall. The fact that the first and second rings and the intermediate annular portion form a single part helps to reduce the risk of leaks between the parts.

According to another feature, the first ring has an axis of revolution, the sealing face of the second ring being substantially perpendicular to the axis of revolution of the first ring.

According to another feature, the first and second rings and the intermediate annular portion form a single part, in which the first ring is made of a first material, and the second ring and the intermediate annular portion are made of a second material.

According to another feature, the holding system has several holes passing through the second ring and opening out in the sealing face, as well as fastening elements seated in said holes.

According to another feature, the holes are regularly spaced apart about the circumference of the sealing face, have axes substantially perpendicular to the sealing face, and are removed from the edges delimiting the sealing face.

According to another feature, the second ring has a rigid tubular insert for each hole, delimiting said hole.

According to another feature, the bulkhead fitting device includes a flat ring-shaped gasket positioned against the sealing face.

According to another feature, the bulkhead fitting device includes an intermediate part including a ring with the contact face against which the sealing face of the second ring is pressed, as well as a skirt linked to the ring and designed to sealingly link the ring and the wall about the entirety of the orifice.

According to another feature, the geometry, dimensions and material of the intermediate annular portion are selected in consideration of the permissible relative movements between the first and second rings and a desired absorption of forces between the first and second rings.

The invention also relates to an installation including a wall with an orifice, a conduit passing through the wall via the orifice and at least one bulkhead fitting device as claimed in one of the preceding claims linking the conduit and the wall.

BRIEF DESCRIPTION OF THE DRAWINGS

Other features and advantages are set out in the description of the invention below, given purely by way of example and with reference to the attached drawings, in which.

DETAILED DESCRIPTION OF THE PREFERRED EMBODIMENTS

Figure 1:
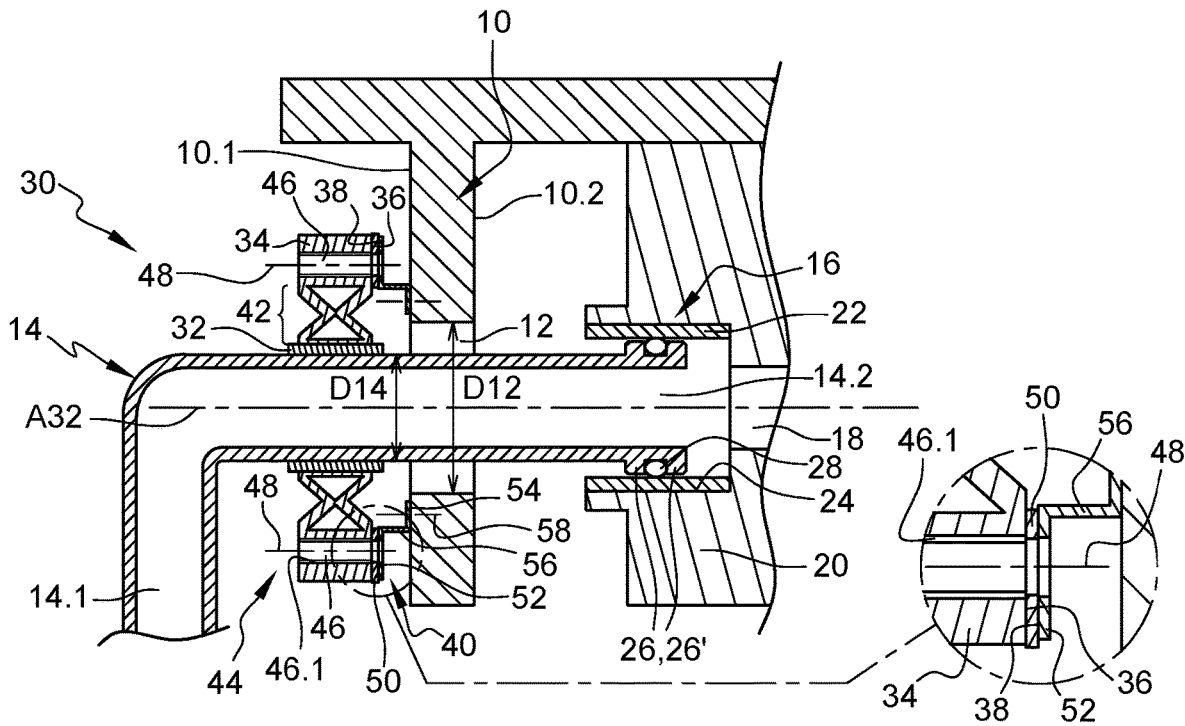
FIG. 1 is a cross section view of an installation including a wall, a conduit passing through the wall, and a bulkhead fitting device showing a first embodiment of the invention.
Figure 2:
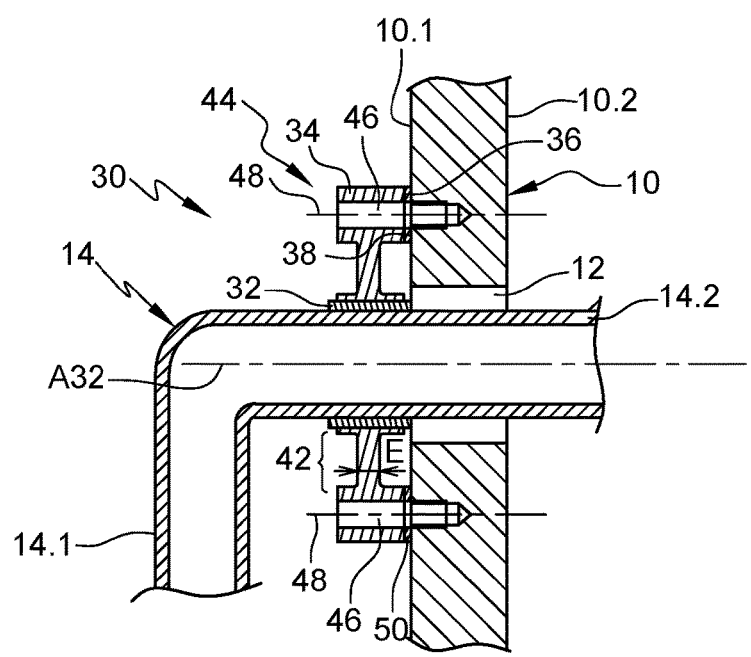
FIG. 2 is a cross-section view of an installation including a wall, a conduit passing through the wall, and a bulkhead fitting device showing a second embodiment of the invention.

As shown in FIGS. 1 and 2, an installation includes:
- a wall 10 with a first face 10.1, a second face 10.2 opposite the first face 10.1, and an orifice 12 opening out in the first and second faces 10.1, 10.2,
- a conduit 14 passing through the wall 10 via the orifice 12, which has first and second ends 14.1, 14.2 positioned on the two sides of the wall 10, the first end 14.1 being positioned on the side of the first face 10.1 of the wall 10, and the second end 14.2 being positioned on the side of the second face 10.2.

According to one configuration, the orifice 12 has a circular section and an internal diameter D12. At the wall 10, the conduit 14 has a circular section and an external diameter D14 less than the internal diameter D12 of the orifice 12.

According to one embodiment shown in FIG. 1, the second end 14.2 of the conduit 14 is connected by a connection system 16 to an orifice 18 of a part 20. This connection system 16 has a ring 22 inserted into a counterbore 24 provided on the orifice 18. In parallel, the second end 14.2 of the conduit 14 has two flanges 26, 26' rigidly connected to the conduit 14 and spaced slightly apart, forming an annular seat therebetween. Additionally, the connection system includes a ring gasket 28 positioned in the annular seat. The maximum diameter of the flanges 26, 26' is less than the internal diameter of the ring 22, and the ring gasket 28 is designed to be slightly compressed between the conduit 14 and the ring 22.

This connection system 16 enables slight relative movements between the conduit 14 and the part 20.

Naturally, the invention is not limited to this configuration for the second end 14.2, which may be linked or otherwise to a part using different connection systems.

The installation includes a bulkhead fitting device 30 interposed between the conduit 14 and the wall 10.

This bulkhead fitting device 30 comprises:
- a first ring 32 designed to be positioned about the conduit 14 and sealingly linked to said conduit,
- a second ring 34 having a sealing face 36 designed to be oriented towards the first face 10.1 of the wall 10 and to be pressed against a contact face 38 of the wall 10 (as shown in FIG. 2) or of an intermediate part 40 linked to the wall 10 (as shown in FIG. 1),
- an elastically deformable intermediate annular portion 42 sealingly linking the first and second rings 32, 34.

The first and second rings 32, 34 are coaxial, the first ring 32 being positioned at least partially inside the second ring 34.

According to one configuration, the first ring 32 has an axis of revolution A32. The sealing face 36 of the second ring 34 is flat, ring-shaped, and is substantially perpendicular to the axis of revolution A32 of the first ring 32.

The first and second rings 32, 34 and the intermediate annular portion 42 form a single part.

According to one embodiment, the first ring 32 is made of a first material, and the second ring 34 and the intermediate annular portion 42 are made of a second material. The first ring 32 can be made of metal. The second ring 34 and the intermediate annular portion 42 can be made of elastomer.

By way of example, the first ring 32 is a metal tube on which the elastomer second ring 34 and the intermediate annular portion 42 are overmolded.

Regardless of the embodiment, the first ring 32 is positioned about the conduit 14 and linked thereto to form an excellent seal between the first ring 32 and the conduit 14.

The first ring 32 can be force fitted onto the conduit 14, glued, welded or linked using any assembly technique ensuring an optimal seal between the conduit 14 and the first ring 32.

The intermediate annular portion 42 is configured in consideration of the desired characteristics in terms of permissible relative movements and absorption of forces between the first and second rings 32, 34. The geometry, dimensions and material of the intermediate annular portion 42 are selected to enable the absorption of forces between the first and second rings 32, 34 in at least a first direction and at least one relative movement between the first and second rings 32, 34 in a second direction different to the first direction. This intermediate annular portion 42 can also absorb vibrations.

Figure 3:
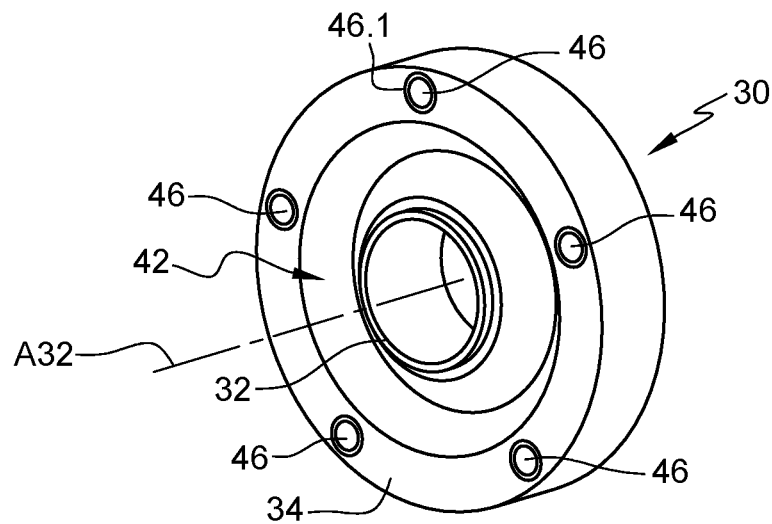
FIG. 3 is a perspective view from a first viewing angle of a bulkhead fitting device showing one embodiment of the invention.
Figure 4:
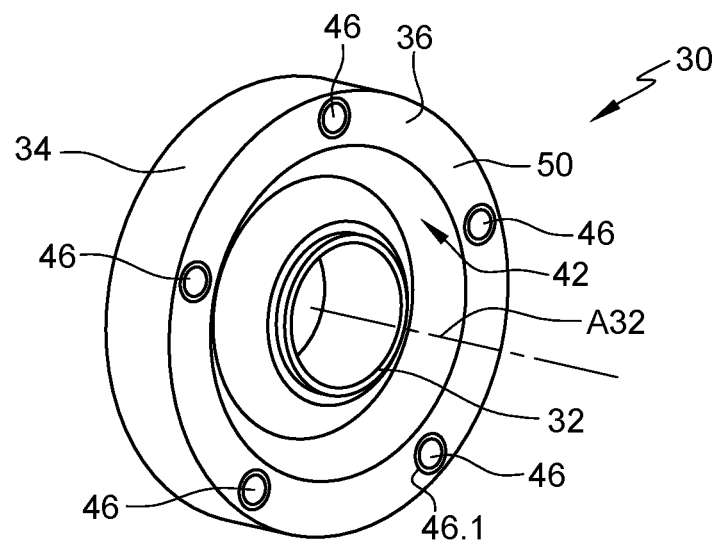
FIG. 4 is a perspective view from a second viewing angle of the bulkhead fitting device shown in FIG. 3.

According to one embodiment shown in FIGS. 1, 3 and 4, the cross section of the diabolo-shaped intermediate annular portion 42 (in a plane passing through the axis of revolution A32) is substantially constant about the entire circumference thereof. The geometry of the first embodiment is more specifically designed to enable swiveling movements and to prevent radial movements (perpendicular to the axis of revolution A32), while absorbing radial forces.

According to another embodiment shown in FIG. 2, the intermediate annular portion 42 has a wall positioned in a plane perpendicular to the axis of revolution A32 with a constant thickness E about the circumference, in which the value E depends on the desired characteristics for the intermediate annular portion 42. Therefore, as the thickness E increases, the intermediate annular portion 42 transmits greater forces between the first and second rings 32, 34 and the amplitude of the relative movements between the first and second rings 32, 34 gets smaller. Conversely, as the thickness E decreases, the intermediate annular portion 42 is less able to transmit forces between the first and second rings 32, 34 and the amplitude of the relative movements between the first and second rings 32, 34 gets larger.

The geometry of the second embodiment is more specifically designed to absorb pivoting movements and to permit axial movements parallel to the axis of revolution A32, while absorbing radial forces.

Naturally, the invention is not limited to these geometries for the intermediate annular portion 42. The cross section of the intermediate annular portion about the circumference thereof can be constant or otherwise.

According to one embodiment, the cross section of the second ring 34 is substantially constant about the circumference thereof. By way of example, the cross section of the second ring is approximately rectangular.

The bulkhead fitting device 30 also has at least one holding system 44 designed to press the sealing face 36 against the contact face 38 to create a seal between the sealing and contact faces 36, 38.

According to one embodiment, the holding system 44 has several holes 46 passing through the second ring 34 and opening out in the sealing face 36, as well as fastening elements 48 (shown schematically as a center line), such as screws, bolts or rivets, seated in said holes 46.

According to a first arrangement, the fastening elements 48 also pass through the intermediate part 40 (as shown in FIG. 1) or the wall 10. According to a second arrangement, the fastening elements 48 are screwed into the wall 10 (as shown in FIG. 2) or the intermediate part 40.

According to one configuration, the holes 46 have axes substantially perpendicular to the sealing face 36. These holes 46 are spaced apart regularly about the circumference of the sealing face 36. According to one arrangement, the holes 46 are removed from the edges delimiting the sealing face 36.

According to one embodiment, the second ring 34 has a rigid tubular insert 46.1 for each hole 46, delimiting said hole 46. These inserts 46.1 limit the compression of the second ring 34 in a direction parallel to the axis of the holes 46.

According to one configuration, the bulkhead fitting device 30 includes a flat ring-shaped gasket 50 positioned against the sealing face 36, interposed between the sealing face 36 and the contact face 38. To reinforce the seal between the sealing and contact faces 36, 38, the sealing face 36 can have one or more concentric projecting beads, said beads being designed to be compressed during assembly.

According to a first embodiment shown in FIG. 2, the sealing face 36 of the bulkhead fitting device 30 is pressed directly against the wall 10, and more specifically against the contact face 38 thereof.

According to a second embodiment shown in FIG. 1, the sealing face 36 of the bulkhead fitting device 30 is not pressed directly against the wall 10. According to this second embodiment, the bulkhead fitting device 30 includes an intermediate part 40 linked sealingly to the wall 10 that includes the contact face 38 against which the sealing face 36 is pressed.

Figure 5:
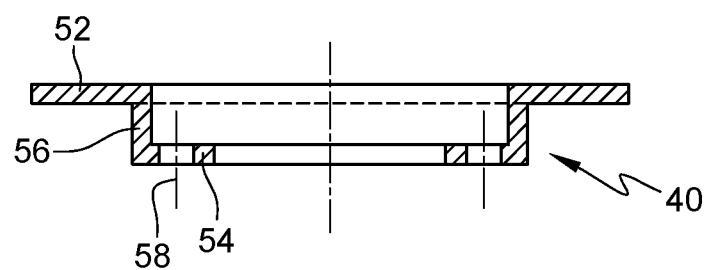
FIG. 5 is a cross-section view of an intermediate part linking a bulkhead fitting device and a wall showing one embodiment of the invention.

According to a configuration shown in FIG. 5, this intermediate part 40 has a first ring 52 positioned in a first plane and delimited by two concentric circular edges, a second ring 54 positioned in a second plane parallel to the first plane and delimited by two concentric circular edges, and a tubular intermediate portion 56 linking one of the edges of the first ring 52 and one of the edges of the second ring 54.

According to one arrangement, the first ring 52 includes the contact face 38 in contact with the sealing face 36 of the bulkhead fitting device 30, and the second ring 54 is pressed against the first face 10.1 of the wall 10 and linked sealingly to the latter using fastening elements 58. According to one embodiment, a flat gasket can be interposed between the second ring 54 and the wall 10 to reinforce the seal. According to another embodiment, the second ring 54 is welded sealingly to the wall 10.

Naturally, the invention is not limited to this embodiment for the intermediate part 40, which usually includes a ring 52 with a contact face 38 against which the sealing face 36 of the second ring 34 is pressed, as well as a skirt linked to the ring 52 sealingly linking the ring 52 and the wall 10 about the orifice 12.

According to the invention, the second ring 34 and the sealing face 36 thereof provide an optimum seal between the bulkhead fitting device 30 and the wall 10, while enabling a load transfer to the wall 10.

The first ring 32 is designed to provide a sealed link with the conduit 14.

Finally, the intermediate annular portion 42 sealingly links the first and second rings 32, 34 and can be deformed elastically. The geometry, dimensions and material of this intermediate annular portion 42 are selected in consideration of the loads to be transmitted between the first and second rings 32, 34 and the necessary relative movements between the first and second rings 32, 34.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An installation comprising:
a wall with an orifice,
a conduit passing through the wall via the orifice, and
a bulkhead fitting device linking the conduit and the wall,
wherein the bulkhead fitting device comprises:
a first ring configured to be positioned about the conduit and sealingly linked to said conduit on a first face side of the wall,
a second ring having a flat, ring-shaped sealing face configured to be oriented towards the wall on the first face side of the wall and to be pressed against a contact face of an intermediate part linked to the wall,
an elastically deformable intermediate annular portion sealingly linking the first and second rings,
a holding system configured to press the sealing face against the contact face to create a seal between the sealing and contact faces,
the first and second rings and the intermediate annular portion forming a single part,
wherein the first ring has an axis of revolution,
wherein the intermediate part comprises a third ring comprising the contact face against which the sealing face of the second ring is pressed, a tubular middle portion linking an edge of the third ring to a fourth ring configured to sealingly link the third ring and the wall about an entirety of the orifice,
wherein the fourth ring is offset from the third ring in a direction transverse to the axis of revolution of the first ring.

2. The installation as claimed in claim 1, wherein the sealing face of the second ring is substantially perpendicular to the axis of revolution of the first ring.

3. The installation as claimed in claim 1, wherein the first ring is made of a first material, and the second ring and the intermediate annular portion are made of a second material.

4. The installation as claimed in claim 1, wherein the holding system has several holes passing through the second ring and opening out in the sealing face, as well as fastening elements seated in said holes.

5. The installation as claimed claim 4, wherein the holes are regularly spaced apart about a circumference of the sealing face, have axes substantially perpendicular to the sealing face, and are removed from edges delimiting the sealing face.

6. The installation as claimed in claim 4, wherein the second ring has a rigid tubular insert for each hole, delimiting said hole.

7. The installation as claimed in claim 1, wherein the bulkhead fitting device includes a flat ring-shaped gasket positioned against the sealing face.

* * * * *